US012747007B2

(12) United States Patent
Andersen

(10) Patent No.: US 12,747,007 B2
(45) Date of Patent: Sep. 29, 2026

(54) SURFACE-CLEANING DEVICE AND VEHICLE

(71) Applicant: Trosvik Oceantech AS, Brevik (NO)

(72) Inventor: Robert Andersen, Notodden (NO)

(73) Assignee: Trosvik Oceantech AS, Brevik (NO)

(*) Notice: Subject to any disclaimer, the term of this patent is extended or adjusted under 35 U.S.C. 154(b) by 43 days.

(21) Appl. No.: 18/853,390

(22) PCT Filed: Mar. 29, 2023

(86) PCT No.: PCT/EP2023/058178
§ 371 (c)(1),
(2) Date: Oct. 1, 2024

(87) PCT Pub. No.: WO2023/194183
PCT Pub. Date: Oct. 12, 2023

(65) Prior Publication Data

US 2025/0214117 A1 Jul. 3, 2025

(30) Foreign Application Priority Data

Apr. 5, 2022 (NO) .................................... 20220421

(51) Int. Cl.
*B63B 59/08* (2006.01)
*B08B 3/02* (2006.01)
(Continued)

(52) U.S. Cl.
CPC .............. *B63B 59/08* (2013.01); *B08B 3/024* (2013.01); *B08B 3/14* (2013.01); *B63B 59/06* (2013.01); *B08B 2203/027* (2013.01)

(58) Field of Classification Search
None
See application file for complete search history.

(56) References Cited

U.S. PATENT DOCUMENTS 5,321,869 A 6/1994 Kaempf
2013/0263770 A1* 10/2013 Andersen ................. B63G 8/26
114/330

FOREIGN PATENT DOCUMENTS

WO 2012/074408 A2 6/2012
WO 2016/033678 A1 3/2016
(Continued)

OTHER PUBLICATIONS

Norwegian Search Report issued Jul. 25, 2022 in Norwegian App. No. 20220421 (2 pages).
(Continued)

*Primary Examiner* — Kaj K Olsen
*Assistant Examiner* — Ryan L Coleman
(74) *Attorney, Agent, or Firm* — Akerman LLP

(57) ABSTRACT

The invention concerns a cleaning device for cleaning a surface submerged in water, a cleaning system comprising a plurality of the cleaning devices, an underwater vehicle comprising the cleaning system and a method using the underwater vehicle.
The cleaning device comprises a disk member rotatable around a rotational axis r, a disk housing covering the disk member, a spindle rotatably coupled to the disk member and a rotary motor providing rotational power to the spindle. The disk member comprises a first side facing away from the surface to be cleaned during cleaning operation and a concave second side facing towards the surface to be cleaned during cleaning operation.

15 Claims, 7 Drawing Sheets

(51) Int. Cl.

| | |
|---|---|
| ***B08B 3/14*** | (2006.01) |
| ***B63B 59/06*** | (2006.01) |

(56) References Cited

FOREIGN PATENT DOCUMENTS

| | | | | |
|---|---|---|---|---|
| WO | 2018/096214 | A1 | | 5/2018 |
| WO | WO2018199767 | | * | 11/2018 |

OTHER PUBLICATIONS

International Search Report and Written Opinion of the the International Searching Authority issued Jul. 14, 2024 in PCT/EP2023/058178 (9 pages).

* cited by examiner

SURFACE-CLEANING DEVICE AND VEHICLE

CROSS-REFERENCE TO RELATED APPLICATIONS

This application claims the benefit under 35 U.S.C. § 371 to Patent Cooperation Treaty App. No.: PCT/EP2023/058178 titled "A Surface-Cleaning Device and Vehicle," filed on Mar. 29, 2023, and currently pending; PCT/EP2023/058178 claims priority to Norwegian App. No. 20220421 titled "A Surface-Cleaning Device and Vehicle," filed on Apr. 5, 2022, and currently pending. The entire contents of PCT App. No.: PCT/EP2023/058178 and Norwegian App. No.: 20220421 are incorporated herein by reference for all purposes.

FIELD OF THE INVENTION

The invention concerns a cleaning device, a cleaning system, an underwater vehicle and a method for cleaning large submerged surfaces.

BACKGROUND OF THE INVENTION

A ship's hull which is subjected to marine organisms is prone to barnacle growth and general fouling, making the hull surface rough and uneven. This leads to greater friction resistance when the ship is propelled through the water, which in turn means a significant increase in fuel consumption. It is known that a 1% increase in friction causes approximately a 3% fuel consumption increase. Frequent hull cleaning is therefore required, both from economical and environmental points of view.

Developing suitable and practical cleaning equipment for large surfaces, such as ships' hulls, is a considerable challenge, partly due to the hulls' limited accessibility when submerged in water.

Also, ships' hulls are commonly coated with toxic paints, containing organic tin compounds. Such compounds should not be dislodged from the hull, as they may contaminate the surrounding marine life. It is therefore desirable to use cleaning equipment that removes debris/impurities (fouling, etc.) from the hull, but damages the hull paint as little as possible.

The state of the art includes a number of devices for cleaning large surfaces, such as ships' hulls, comprising both the use of brushes and spraying with pressurized water through nozzles. Some devices have nozzles arranged on rotatable members, some have the nozzles arranged on an arm or on a ring-shaped member, while others have the nozzles arranged on a solid disc.

U.S. Pat. No. 4,926,775 discloses a cleaning device intended for use on mainly vertical surfaces under water. The apparatus comprises nozzles, arranged on a rotary disc, to spray water under high pressure against a surface. The rotational axis of the disc is mainly perpendicular to the surface to be cleaned. The nozzles are arranged obliquely, in order to provide the spraying water with a tangential motion component, leading to a reactive force that sets the disc in rotation. In addition, one or more of the nozzles are directed away from the surface to be cleaned in order to maintain the apparatus in a position close to the same surface.

WO 2005/044657 discloses a device for cleaning underwater surfaces, such as ships' hulls. The device comprises a rotary disc having nozzles for discharging pressurized liquid against the surface to be cleaned. The nozzles are mounted obliquely in relation to the rotational axis of the rotary disc and are arranged to be supplied with pressurized liquid through a hollow spindle that is concentric with the rotational axis.

WO 2012/074408 discloses a device for cleaning of ship's hulls or other submerged surfaces. The device comprises a disk member rotatably supported by a spindle. The disk member comprises a plurality of nozzles for discharging liquid under pressure against the surface to be cleaned and a plurality of through holes, spaced at regular intervals. WO 2012/074408 also discloses a remotely operated vehicle (commonly referred to as an ROV) for carrying hull cleaning devices.

Yet another example of a device for cleaning of a ship's hull is disclosed in KR 2008/0093536 A.

WO2016033678A1 discloses a device for cleaning an underwater surface by employing an assembly of brushes/shroud that can be supported on a brush cart with freedom of movement relative to a frame of the brush cart.

U.S. Pat. No. 5,321,869A describes a device for removing paint from painted surfaces by employing high energy jets positioned against a painted surface.

It is an object of this invention to provide a cleaning device, a cleaning system, and an underwater vehicle that is more efficient and simpler to operate that those of the prior art.

Another object of the invention is to provide a cleaning device, a cleaning device and an underwater vehicle that may be clean submerged surfaces across a large area in a more time efficient manner compared to prior art.

Yet another object of the invention is to provide a cleaning device, a cleaning device and an underwater vehicle that may perform cleaning operations requiring a lower power consumption compared to prior art.

Yet another object of the invention is to provide a cleaning device, a cleaning device and an underwater vehicle that reduces mechanical wear of the equipment compared to prior art.

SUMMARY OF THE INVENTION

The invention is set forth and characterized in the main claims, while the dependent claims describe other characteristics of the invention.

In a first aspect, the invention concerns a cleaning device suitable for cleaning a surface submerged in water.

The cleaning device comprises a disk member rotatable around a rotational axis r, a disk housing covering at least partly, preferably fully, the disk member, a spindle rotatably coupled to the disk member and a rotary motor providing rotational power to the spindle. The rotational axis r defines an axial direction of the cleaning device. The radial direction is thus defined as the direction perpendicular to the rotational axis.

The disk member comprises a first side facing away from the surface to be cleaned during cleaning operation and a concave second side facing towards the surface to be cleaned during cleaning operation, and wherein the disk housing covers the first side.

The disk housing is furthermore arranged and configured relative to the disk member such that a gap is formed between a radial periphery of the disk member and an inner wall of the disk housing and that a suction cavity is provided between the inner wall and the first side.

The cleaning device also comprises one or more discharge channels arranged in fluid communication with the suction cavity via at least one outflow opening) in the disk housing.

The outflow opening(s) is/are arranged at the radial periphery of the disk member to allow radial or near radial discharge of liquids from within the suction cavity. The radial discharge may be parallel or near parallel to the first side at the disk's radial periphery.

The disk member further comprises one or more nozzles for discharging cleaning fluids under pressure against the surface, one or more nozzle conduits configured to establish fluid communication from a cleaning fluid source located outside the cleaning device to the nozzle(s) and a plurality of vanes protruding from the first side and into the suction cavity. The nozzle(s) is/are preferably arranged at the radial periphery of the disk member. At least a part of the nozzle conduit(s) may form an integral part of the disk member. The vanes contribute to an underpressure relative to the pressure on the opposite side of the disk member, thus creating a pumping effect during cleaning operation.

The disk member is further configured such that, during cleaning operation, liquids flowing into the suction cavity from the concave second side during a cleaning operation are passing entirely through the gap. Hence, with the exception of the nozzle conduit(s) (which should be set with an overpressure relative to the pressure remote from the cleaning device) and the gap, there cannot be any channels present that can establish fluid communication between an volume at the concave second side and the suction cavity. With other words, the disk member should be non-permeable for liquids from the second side except through the gap. Due at least partly to the significant concave form, thus forming a low surface area having high proximity to the surface to be cleaned, a high rotational velocity of the disk member may be set, for example 800 rpm or more.

The concave form is measured relatively to the surface to be cleaned.

In an exemplary configuration, at least part of the outflow opening(s) of the disk housing is arranged at the gap.

In another exemplary configuration, the discharge channel(s) is/are configured such that liquids discharging from the suction cavity through the outflow opening(s) changes from an at least substantially radial direction to a direction with an axial component, preferably with an angle less than 45° of an axial direction, more preferably less than 15°, for example parallel to the axial direction. As mentioned above, the axial direction corresponds to the rotational axis r.

Hence, with the configuration as described above, a part of the cleaning device acts at least similar to a traditional centrifugal pump in which fluid in transported by conversion of rotational kinetic energy to hydrodynamic energy of the fluid flow.

In yet another exemplary configuration, the disk member has a circular cross-sectional area and the rotational axis r constitutes a centre axis of the disk member. Moreover, the spindle comprises an axial centre channel constitutes part of the nozzle conduit(s), wherein the axial centre channel is aligned with the rotational axis r.

In yet another exemplary configuration, at least one, and preferably at least two, of the plurality of vanes extend(s) from a centre area of the disk member to or near the radial periphery, wherein the centre area at least includes the disk member's radial centre point. The term 'near' is herein defined as less than 10% from the radial periphery relative to the diameter of the disk member, more preferably less than 5%.

In yet another exemplary configuration, some or each of the plurality of vanes is/are designed as an arc and arranged rotationally symmetric around the rotational axis r of the disk member, i.e. rotationally symmetric around the spindle.

In yet another exemplary configuration, the concave second side of the disk member is designed such that a ratio between a maximum radial diameter of the concave shape and a maximum axial height of the concave shape is less than 30, more preferably less than 25, more preferably less than 23, for example 20.

In yet another exemplary configuration, the first side is parallel, or near parallel, to the concave second side.

In yet another exemplary configuration, the cleaning device comprises a plurality of nozzles arranged at regular intervals around the radial periphery of the disk member. Further, the nozzles are configured such that the discharge flow has an axial component.

In yet another exemplary configuration, the disk member is designed such that, during cleaning operation, less than 10% of the area of the concave second side is situated to a minimum distance to the surface to be cleaned, i.e. set by a spacer not part of the disk member. The minimum distance from the surface to be cleaned is typically set to 2-5% of the disk member's diameter.

In yet another exemplary configuration, the rotary motor is configured for rotating the disk member at a velocity above 800 rpm. Due to the reduced area of proximity, i.e. the area having a minimum distance to the surface to be cleaned, set by the concavity of the second side, the suction forces correspond remains low even at such high rotational velocity, typically corresponding to a weight of less than 40 kg.

In yet another exemplary configuration, the cleaning device further comprises a spacer such as arranged and configured for maintaining the disk member a minimum offset distance from the surface to the cleaned. The spacer may for example be a set of rollers/wheels, an adjuster ring, a spacing pipe, or a combination thereof. Due to the concave form of the second side, the minimum offset distance is typically the distance from the surface to the radial periphery.

For example, spacers in form of wheels may be expedient when cleaning smooth surfaces such as ship hulls, while adjuster rings and/or spacing pipes may be expedient on more open structures such as nets used in fish farming.

In a second aspect, the invention concerns a cleaning system comprising a plurality of cleaning devices as described above.

For each cleaning device, at least the disk member, the disk housing, the spindle, the rotary motor, the at least one outflow opening and the discharge channel constitute a first stage pumping system.

The cleaning system moreover comprises a second stage pumping system comprising a motorized pump, a central liquid collector and at least one second stage hose for each of the plurality of cleaning devices.

Each second stage hose is arranged in fluid communication with the central liquid collector at one end and with the discharge channel of the respective cleaning device at the other end.

The central liquid collector comprises a pump inlet and a pump outlet set in fluid communication with the central liquid collector.

The second stage pumping system is configured to pump the liquids from the suction cavity of the first stage pumping system and to the central liquid collector.

Hence, the inventive system according to this particular configuration includes two pumping stages;

at the first stage liquid enters the suction cavity due to generated underpressure within the suction cavity relative to the surroundings;

in the second stage an external pumping system allows further pumping of the liquid from the suction cavity, via the central liquid collector and out of the pump outlet.

The first pumping stage results in an increase in liquid velocity from the suction cavity providing inter alia the advantages effect of necessitating significantly less pumping effect at the second pumping stage.

Hence, the motorized pump may have a maximum effect, or be operated at an effect, which is less than the effect required to pump liquids from the second side of the disk member to the central liquid collector if the first stage pumping system had not been present.

In an exemplary configuration of the second aspect, the cleaning system further comprises a central framework onto which the central liquid collector is fixed and a plurality of couplers connecting the plurality of cleaning devices to the central framework. The number of cleaning devices preferably equals the number of couplers.

In another exemplary configuration of the second aspect, the plurality of couplers is configured such that at least one of the cleaning devices may pivot relative to the central framework when exposed to external pressure during cleaning operation. The external pressure may for example be deviations of the surface to be cleaned from a planar surface. The pressure of the cleaning system towards the non-planar surface would thus induce said pivoting of the one or more cleaning devices in order to substantially maintain a minimum offset distance to the disk members.

In yet another exemplary configuration of the second aspect, the cleaning system further comprises an external hose configured to guide liquids from the central liquid collector, via the pump outlet, to an exterior location and a check valve connected to the external hose and configured to control flow of liquids from the central liquid collector.

In yet another exemplary configuration of the second aspect, the cleaning system further comprises a filter system comprising a first end in fluid communication with the central liquid collector. The filter system is configured to filter particulates from the liquid pumped from the suction cavity, for example all particulates with a size/diameter exceeding 10 microns.

In a third aspect, the invention concerns an underwater vehicle comprising a cleaning system as described above, a set of front and rear vehicle rollers such as wheels arranged and configured for rolling the underwater vehicle on the surface to be cleaned and a plurality of thrusters arranged and configured to allow movements of the underwater vehicle in at least a direction perpendicular to the surface to be cleaned and a direction parallel to the surface to be cleaned. The set of front and rear vehicle rollers are preferably further configured to rotate around an axis perpendicular to the surface to be cleaned.

In an exemplary configuration of the third aspect, the vehicle is a neutrally buoyant ROV.

In a third aspect, the invention concerns a method for cleaning a surface submerged in water by use of an underwater vehicle as described above.

The method comprises the following steps:

guiding the underwater vehicle by use of the plurality of thrusters until the cleaning system is set at a predetermined minimum offset distance from the surface to be cleaned, for example by use of spacers such as the above mentioned set of rollers, rotating the disk member by use of the rotary motor to a rotational velocity exceeding 350 rpm, preferably exceeding 400 rpm, more preferably exceeding 500 rpm, activating the motorized pump of the second stage pumping system and guiding the underwater vehicle by use of the plurality of thrusters parallel to the surface to be cleaned.

BRIEF DESCRIPTION OF THE DRAWINGS

These and other characteristics of the invention will be clear from the following description of preferential form of embodiments, given as non-restrictive examples, and with reference to the attached drawings.

FIGS. 4A and 4B are cut-out views of an embodiment of a cleaning device according to the invention, wherein FIG. 4B shows typical direction of liquid flow and pressures during cleaning operation.

DETAILED DESCRIPTION OF A PREFERENTIAL EMBODIMENT

Figure 1:
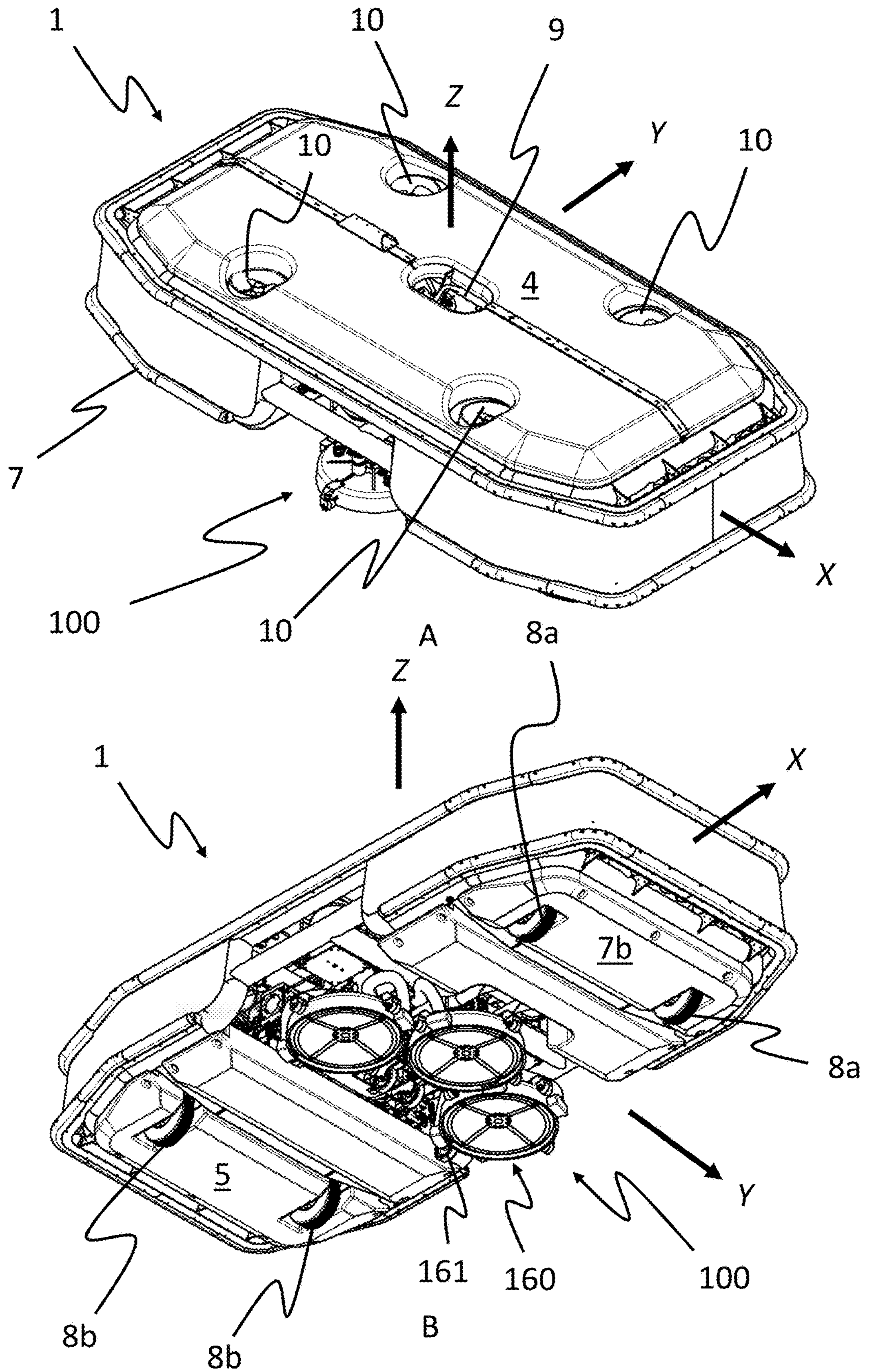
FIGS. 1A and 1B are perspective views of a first embodiment of an underwater vehicle according to the invention.
Figure 2:
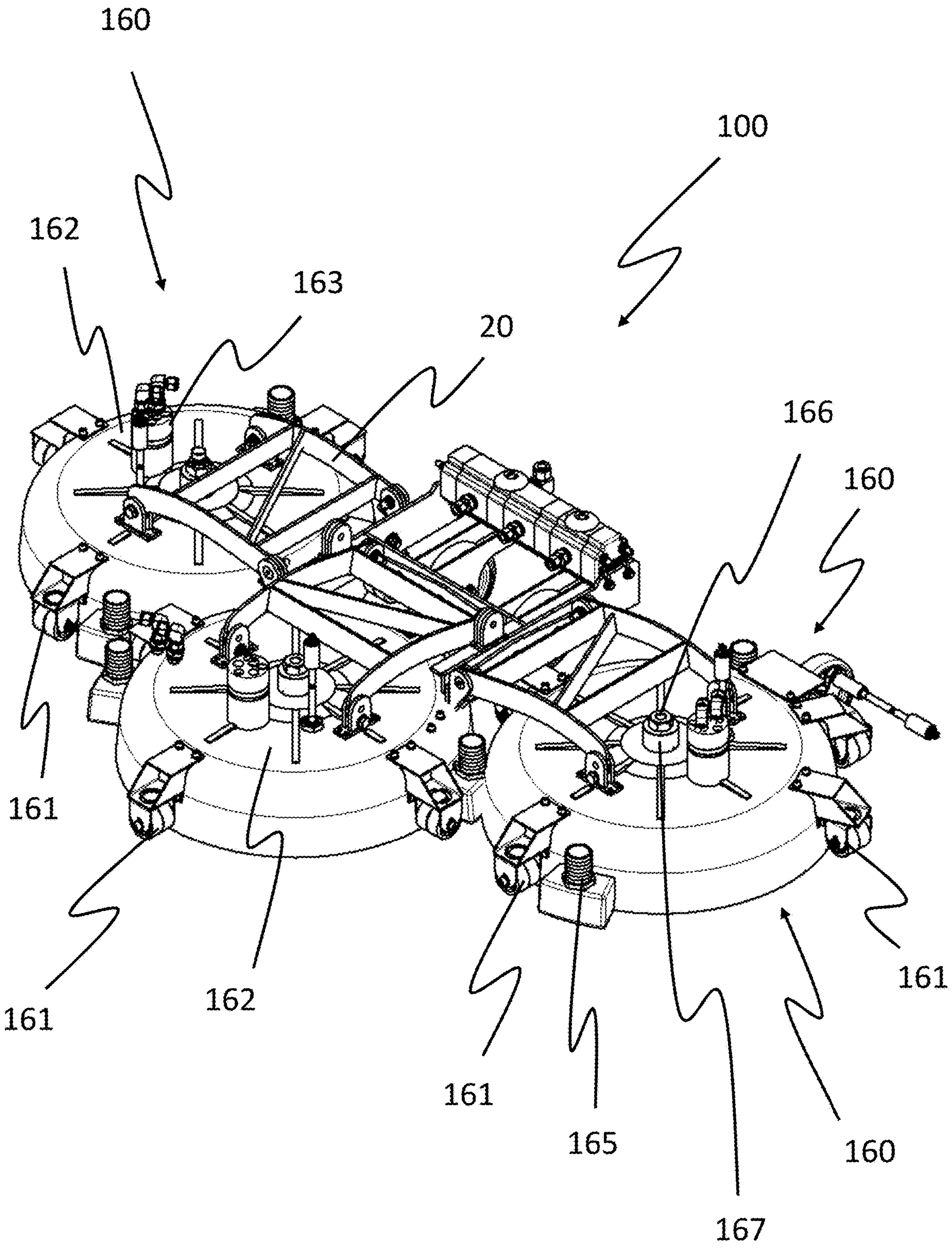
FIG. 2 is a perspective view of an embodiment of a cleaning system according to the invention.

FIGS. 1A and B show a cleaning robot 1 according to the invention, hereinafter called a ROV (remotely operated vehicle), which may perform desired cleaning of surfaces such as the outer surface of a partly submerged hull of a ship.

The cleaning ROV 1 comprises a vehicle framework 7 carrying a cleaning system 100. The ROV 1 may be controlled by an umbilical (not shown) holding power cables and control cables extending to power and control units located for example on a ship or barge on the water surface. The umbilical may also include liquid supply and return hoses for operation of the cleaning system 100.

A coordinate system has been defined for the ROV 1, the axes of which intersect the ROV's centre of gravity. When aligned with the water line, the z axis points upwards and the vehicle framework 7 comprises an upper side 4 from which a lifting hook 9 and the umbilical protrudes and a lower side 5 where wheels 8*a,b* are attached.

The prior art ROV 1 may be furnished with thrusters 10 to control the ROV 1 in the water. These thrusters 10 may be electrically and/hydraulically powered in a manner and with equipment well known in the art.

With particular reference to FIG. 1B, the front wheels 8*a* and/or the rear wheels 8*b* may be a pair of caster wheels. In operation, i.e. when the ROV 1 is used for cleaning a submerged surface such as the submerged portion of a ship's hull, the ROV 1 may be rolling along the hull by aid of the wheels 8*a*, 8*b* and the thrusters 10. The wheels 8*a*, 8*b* thus provide an undercarriage and a rolling support for the ROV 1 against the ship's hull.

With reference to FIGS. 2-5, a cleaning system 100 in accordance with one embodiment of the invention will now be described in more detail.

The cleaning system 100 comprises in the illustrated embodiment three identical cleaning devices/units 160, each comprising cleaning unit wheels 161 and interconnected via respective hinges 20 to a common framework 30. The cleaning unit wheels 161 allows for a predetermined distance of the cleaning device 160 from the ship's full during operation.

Figure 4:
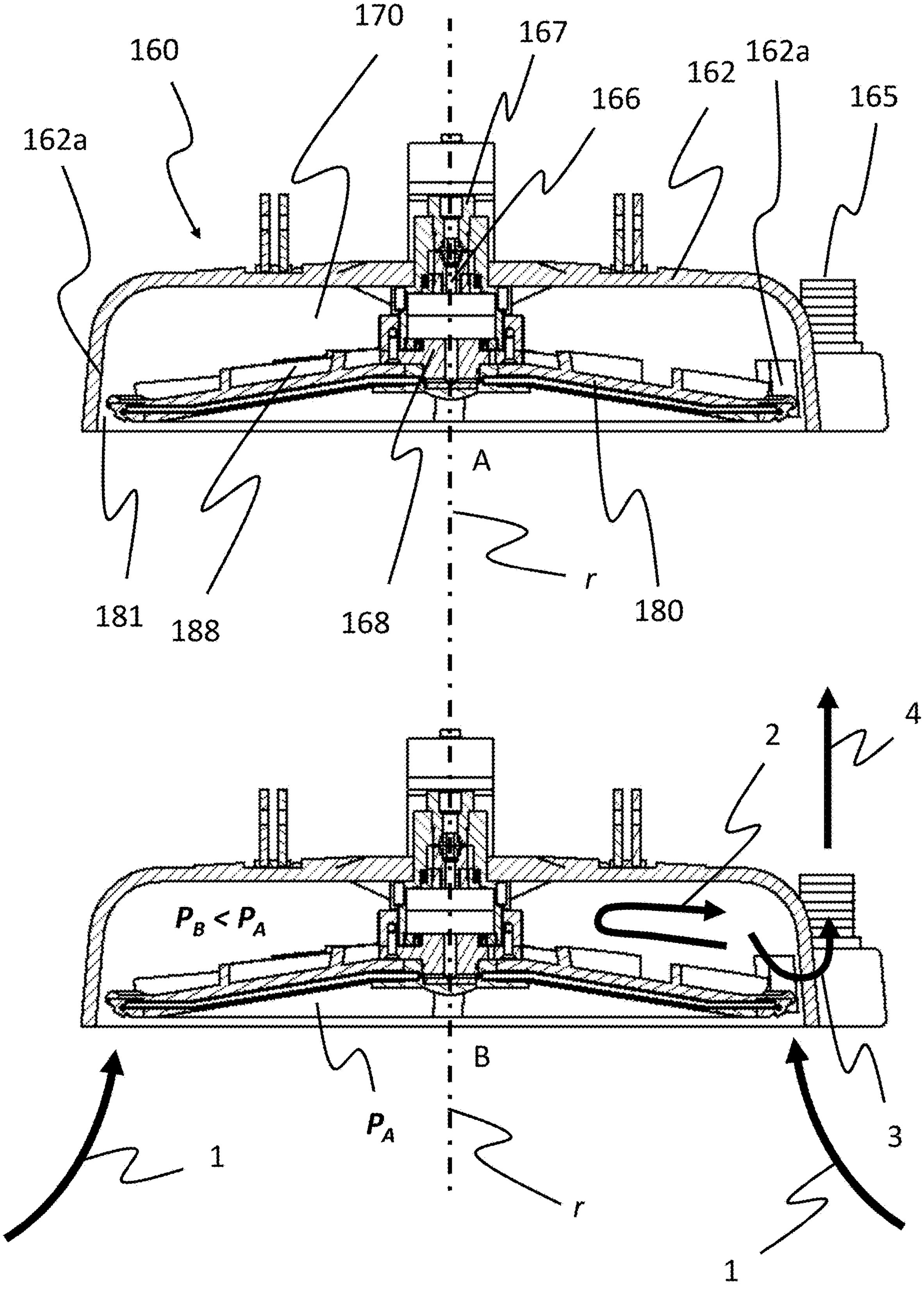

With particular reference to FIG. 4, each cleaning device 160 comprises a cleaning disk 180 arranged in a disk housing 162 (formed as a upside-down bowl) having an inner side 180*a* and a concave outer side 180*b*. The cleaning disk 180 is rotatably supported inside the housing 162 by a central spindle/shaft 167, where a drive motor 163 rotates the central spindle (and thus also the cleaning disk 180) about an axis of rotation r. The drive motor 163 may be hydraulically powered and/or electrically powered. The spindle 167 has a through-going bore 166 extending along the axis of rotation r, through which cleaning fluid is fed into the cleaning disk 180. The cleaning disk 180 further comprises a gear wheel 168 fixed to the spindle 167 and rotationally coupled to the drive motor 163.

The cleaning disk 180 is arranged in the housing 162 such that a suction cavity 170 is formed enclosed by the inner surface 180*a* of the cleaning disk 180 and the inner surface of the housing 162, and with a radial distance/gap 181 between a radial periphery/rim 187 of the disk 180 and the inner surface of the housing 162. The size of the gap 181 is set to allow a desired flow rate of liquid to enter into the suction cavity 170 during operation. A typical gap range may be between 8 mm and 20 mm, or between 10 and 18 mm, or between 12-15 mm.

The liquid is subsequently evacuated from the suction cavity 170 through the outflow openings 162*a* of the housing 162, and further through discharge channels 165 and hoses 35 by aid a motorized pump 33,33*a* forming part of a second stage pumping system (see further description below).

A plurality of vanes 188 are protruding from the inner surface 180*a* of the cleaning disk 180 to generate a swirling motion of the liquid. As best shown in FIG. 5A, these vanes 188 may extend rotationally symmetric from the central spindle 167 towards the disk's radial periphery 187. Furthermore, each of the vanes 188 shown in FIG. 5A have an arc form.

Hence, when the disk 180 is rotated by use of the drive motor 163, the cleaning device 160 act as a centrifugal pump in which liquid is pumped through the gap 181 into the suction cavity 170 due to the developed underpressure therein, and gains kinetic energy when thrown towards the disk's radial periphery 187 by aid of the arced vanes 188.

To emphasize the general function of the cleaning system 100, this centrifugal pump effect is herein called the first stage pumping system of the cleaning system 160. Hence, in the first stage the liquid/water is pumped into the suction cavity 170 via the gap 18. In the second stage, the liquid/water is further pumped from the suction cavity 170 and to a volume located outside the cleaning system 100.

One advantage of the second stage pumping system is that the liquid is discharged from the suction cavity 170 at a higher speed compared to a cleaning system without said centrifugal pump effect. The effect delivered from the drive motor 163 may hence be lower.

A common framework 30 arranged between the three cleaning devices 160 supports a liquid collector 32 configured to receive liquids from the hoses 35 and through one or more collector inflow openings 32*a* and to discharge the liquids through one or more outflow openings and into one or more external hoses 60. The liquid flow into and out of the liquid collector 32 is achieved by a central pump 33 with a pump motor 33*a* arranged on top of the liquid collector 32. A check valve 65 at the outflow opening(s) to control the flow out of the liquid controller 32, in particular to avoid backflow of liquids into the liquid collector 32 via the external hose(s) 60.

Figure 3:
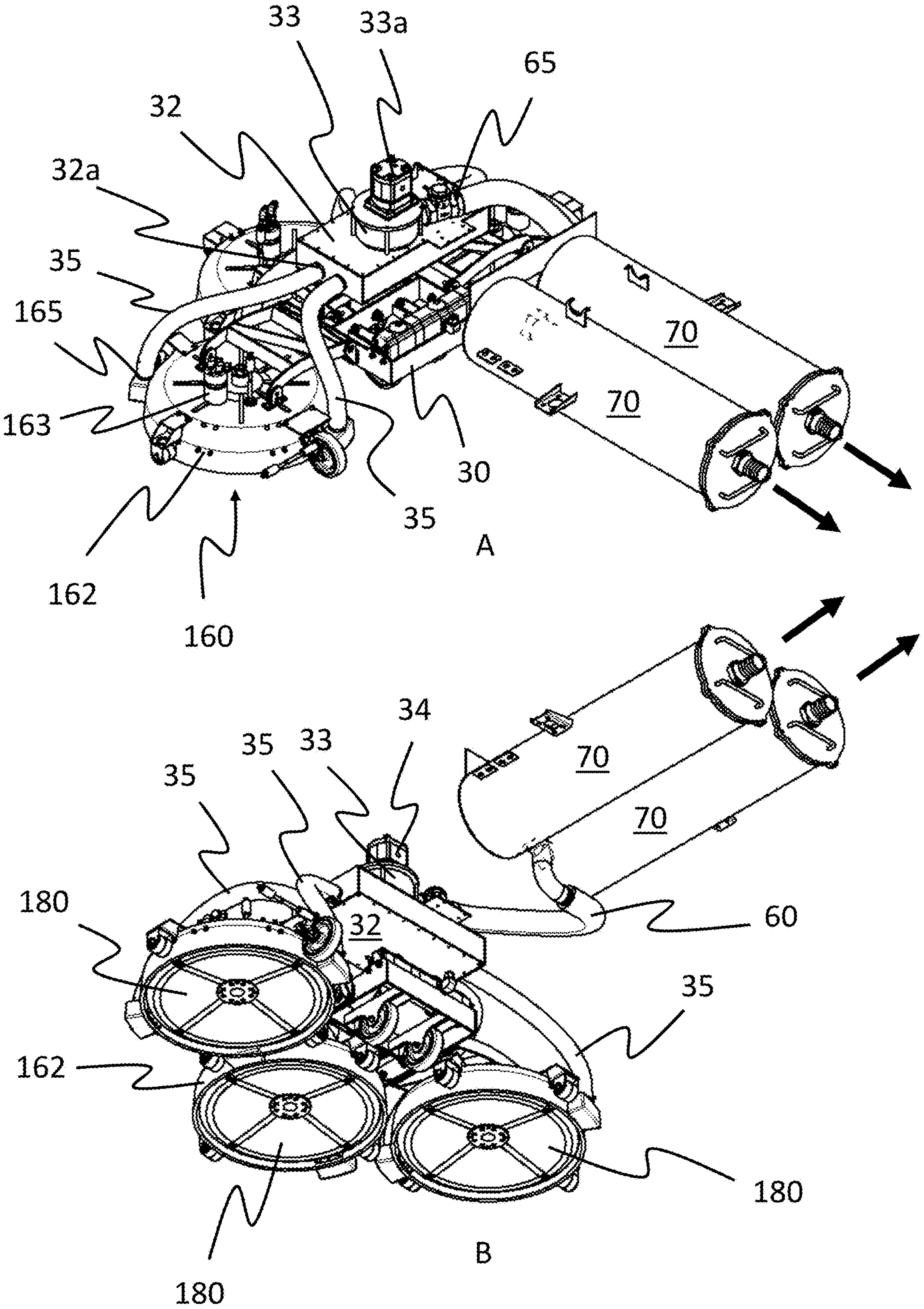
FIGS. 3A and 3B are perspective views of a cleaning system of FIG. 2, including a second stage pumping system.

As illustrated in FIG. 3, one or more filter systems 70 may be arranged in fluid communication with the liquid collector 32 such that the liquids from each of the cleaning devices 160 are flowing via the external hose(s) 60 into the filter system(s) 70, thereby allowing continuous filtering of the return liquid prior to being discharged to the surroundings and/or an external reservoir. For example, the filter system may be designed to filter all particulates with a size/diameter exceeding 25 microns or 15 microns or 10 microns.

Figure 5:
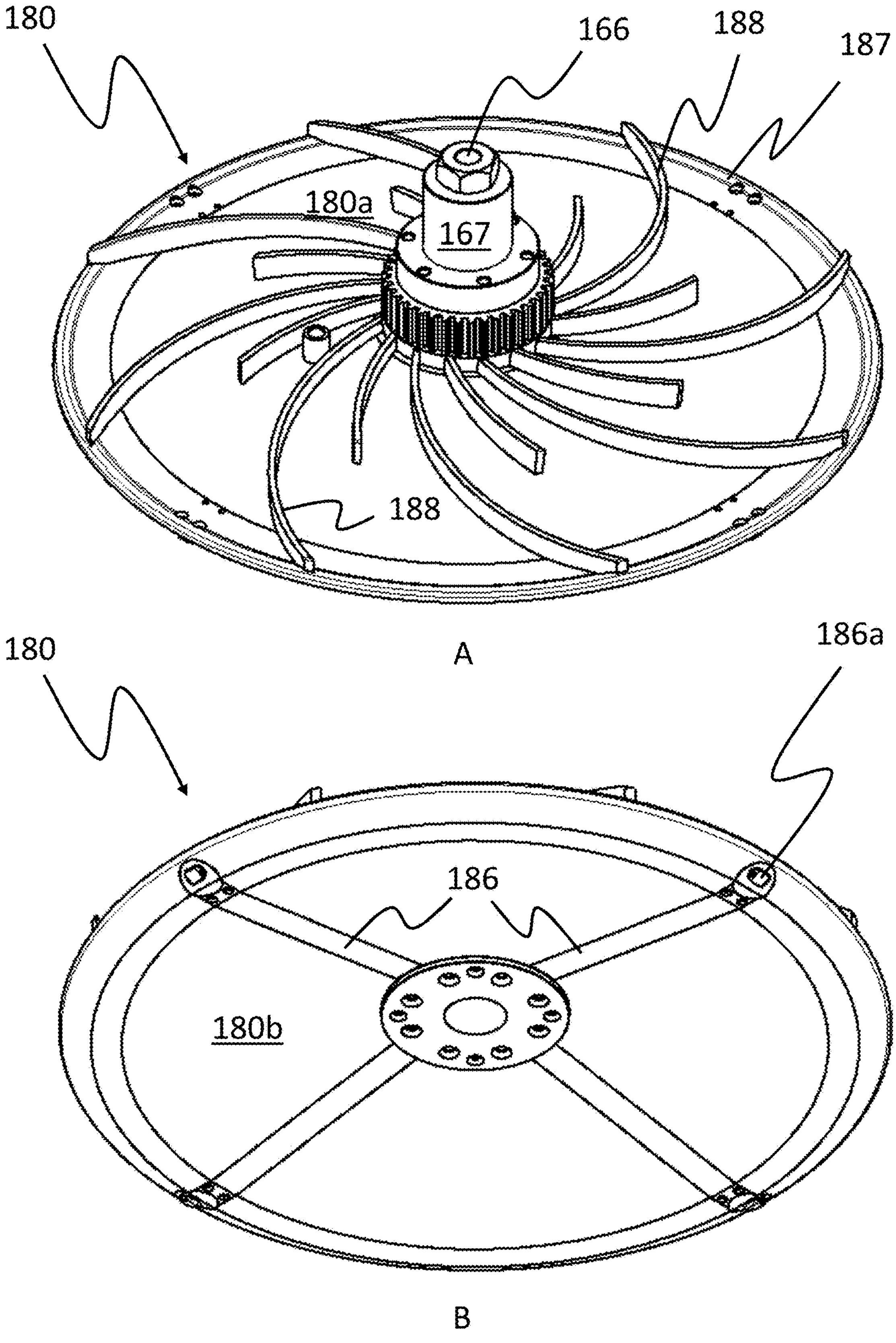
FIGS. 5A and 5B are perspective views of a disk member forming part of a cleaning system according to the invention.

With particular reference to FIGS. 4 and 5, the cleaning disk 180 further comprises a plurality of nozzle channels 186 arranged at regular intervals to transport liquid radially along the disk 180 and out via respective nozzles 186*a* to a volume at the side of the concave outer side 180*b*. Each nozzle channel 186 is set in fluid communication with the bore 166 of the central spindle 167, thereby setting up a continuous nozzle conduit 166,186 which allows cleaning liquids to flow from a reservoir outside the cleaning device 160, through the bore 166 and the nozzle channels 186. By arranging the orientation of the nozzles 186*a* with an angle towards the surface to be cleaned, discharge if the cleaning liquid through the nozzles 186 at high pressure will during cleaning effectively removes dirt/foreign debris from the surface. At least some of the removed dirt/debris will be sucked into the suction cavity 170 and further through the filter system 70.

The pressure with which the cleaning liquid is supplied to the nozzles 186*a* is dimensioned to suit the properties of the surface which is to be cleaned. For example, a pressure of 50 bar is suitable for silicone anti-fouling, while a pressure of 450 bar is suitable for hard-coating.

The cleaning disk 180 is designed such that the disk's outer surface 180*b* forms a concave or near concave shape, thus significantly reducing the area of proximity between the cleaning disk 180 and the surface to the cleaned (e.g. a ship's hull). The reduced proximity minimizes capillary forces occurring when the disk 180 is rotating, thus resulting in a significant reduction in suction force.

The reduced suction force allows the disk 180 to be rotated at a significantly reduced power delivered by the drive motor 163. In contrast to known cleaning systems, the inventive cleaning system 100 with compact cleaning disks 180 (i.e. with no throughgoing holes) may operate at rotational velocities exceeding 1000 rpm without generating operationally hindering suction forces. For example, with a disk diameter of 480 mm and a concavity of 24 mm (i.e. the axial distance between radial periphery 187 and the outer side 180*b* at the disk's radial centre point), a rotation of the disk of 1200 rpm would result in suction forces below 40 kg.

Also, the concave design contributes to reduce mechanical wear of the cleaning system 100.

Although the cleaning robot 1 has been described above in relation to a ship's hull and a fish cage, it should be understood that the invention is equally applicable for operation on any submerged surface, such as any floating vessel, and underwater walls or structures of any kind.

Figure 6:
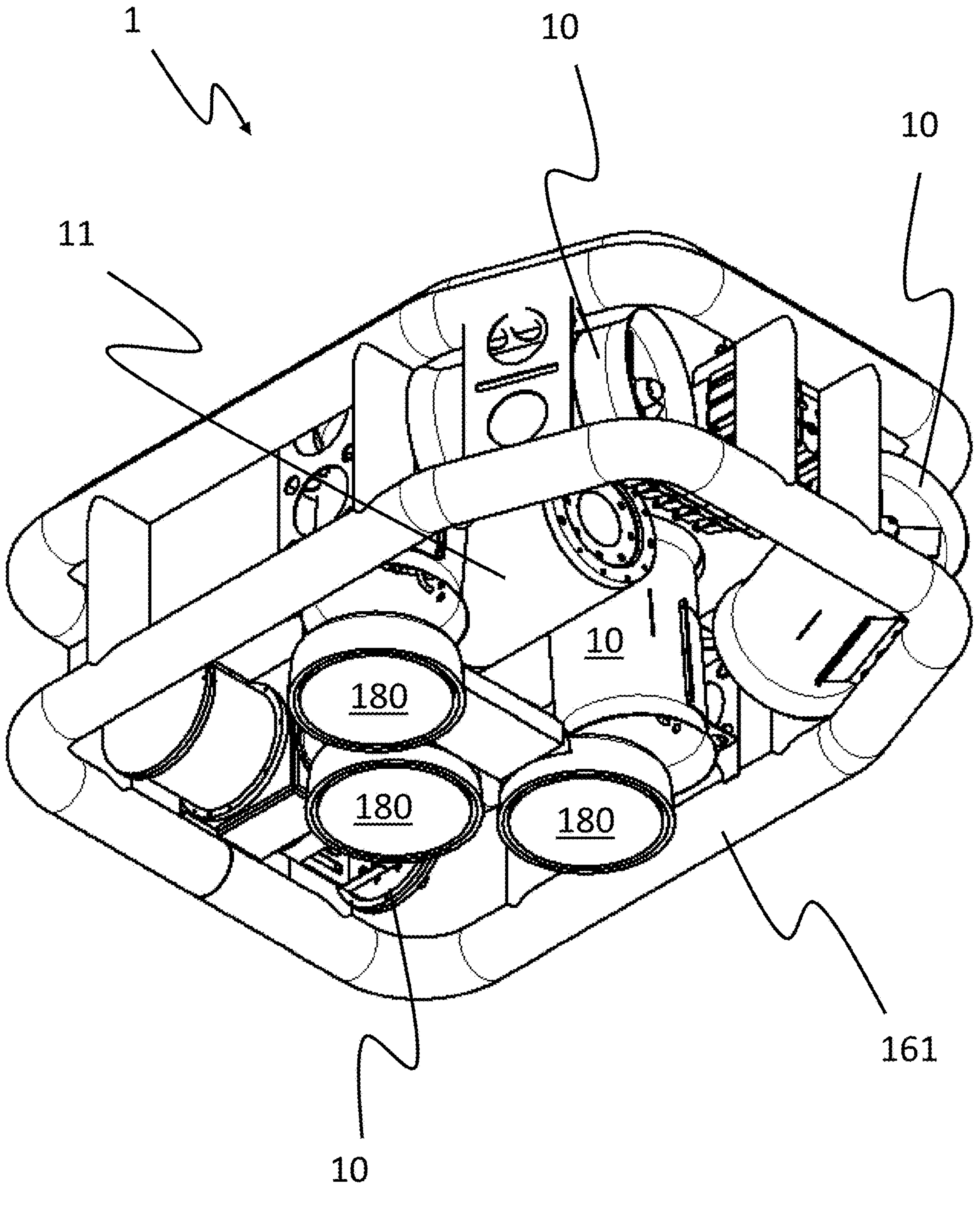
FIG. 6 is a perspective views of a second embodiment of an underwater vehicle according to the invention.
Figure 7:
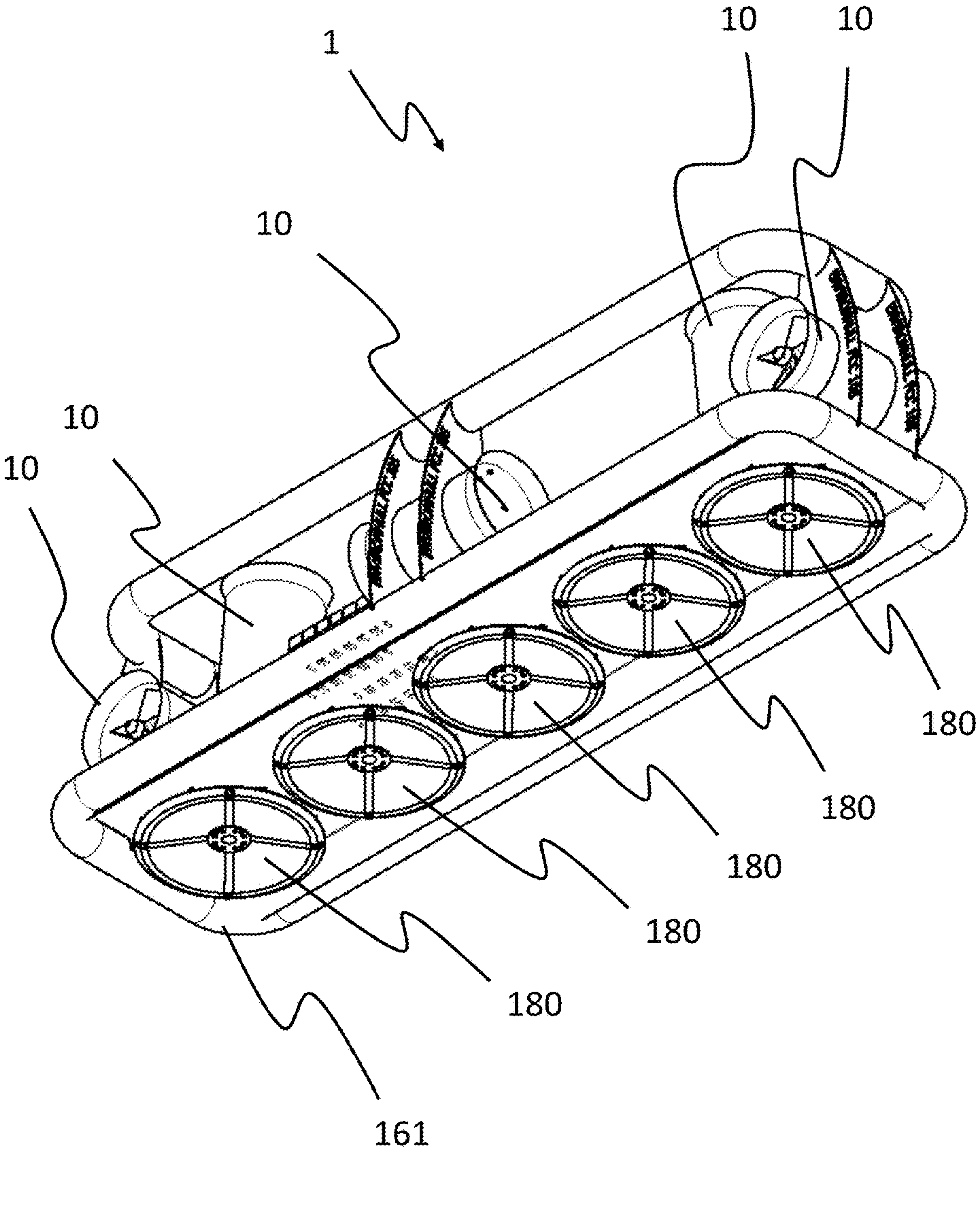
FIG. 7 is a perspective views of a second embodiment of an underwater vehicle according to the invention.

FIGS. 6 and 7 show example of cleaning robots 1 intended for use on alternative surfaces for which movements along surfaces by front and rear wheels are not expedient and/or necessary.

An example of such use is cleaning floating net cages for aquaculture. Similar to the cleaning robot 1 shown in FIG. 1, these cleaning robots 1 also comprises thrusters 10 to allow movements in vertical directions and horizontal directions, i.e. perpendicular and parallel to the surface to be cleaned, respectively.

In FIG. 6, a hydraulic power unit 11 is shown providing necessary power to the thrusters 10.

REFERENCE NUMERALS

| | |
|---|---|
| 1 | Cleaning robot/underwater vehicle/ ROV (remotely operated vehicle) |
| 4 | Upper side of ROV |
| 5 | Lower side of ROV |
| 7 | Vehicle framework |
| 8a | Front vehicle rollers/front ROV wheels |
| 8b | Rear vehicle rollers/rear ROV wheels |
| 9 | Lifting hook/padeye |
| 10 | Thruster |
| 11 | Hydraulic Power Unit |
| 20 | Hinge |
| 30 | Common framework |
| 32 | Liquid collector |
| 32a | Liquid collector inflow opening |
| 33 | Pump |
| 33a | Pump motor |
| 35 | Second stage hose/hose |
| 60 | External hose |
| 65 | Check valve |
| 70 | Filter system |
| 100 | Cleaning system |
| 160 | Cleaning device/cleaning unit |
| 161 | Spacers/Rollers/Spacing pipe/Cleaning unit wheel |
| 162 | Disk housing |
| 163 | Rotary motor for disk member |
| 165 | First stage discharge channels |
| 166 | Bore (within spindle) |
| 167 | Central spindle/hollow shaft |
| 170 | Suction cavity |
| 180 | Cleaning disk |
| 180a | First side/inner side |
| 180b | Concave second side/concave outer side |
| 181 | Radial distance/gap |
| 186 | Nozzle channel |
| 186a | Nozzle |
| 187 | Radial periphery/rim (of cleaning disk 180) |
| 188 | Vane |

The invention claimed is:

1. A cleaning device for cleaning a surface submerged in water, wherein the cleaning device comprises:

a disk member rotatable around a rotational axis (r), wherein the disk member comprises: (i) a first side facing away from the surface to be cleaned during cleaning operation, and (ii) a concave second side facing towards the surface to be cleaned during cleaning operation;

a disk housing covering the first side, wherein the disk housing is arranged and configured such that (i) a gap is formed between a radial periphery of the disk member and an inner wall of the disk housing, and (ii) a suction cavity is provided between the inner wall and the first side;

a spindle rotatably coupled to the disk member;

a rotary motor providing rotational power to the spindle; and a discharge channel arranged in fluid communication with the suction cavity via at least one outflow opening in the disk housing, the at least one outflow opening being arranged at the radial periphery of the disk member to allow radial discharge of liquids from within the suction cavity;

wherein the disk member further comprises:

a nozzle for discharging cleaning fluids under pressure against the surface;

a nozzle conduit configured to establish fluid communication from a cleaning fluid source outside the cleaning device to the nozzle; and a plurality of vanes protruding from the first side and into the suction cavity; and wherein the disk member is non-permeable for liquids from the concave second side except through the gap, such that, during cleaning operation, liquids flowing into the suction cavity from the concave second side during a cleaning operation are passing entirely through the gap.

2. The cleaning device of claim 1, wherein at least part of the at least one outflow opening of the disk housing is arranged at the gap.

3. The cleaning device of claim 1, wherein the discharge channel is configured such that liquids discharging from the suction cavity through the at least one outflow opening change from a radial direction to a direction with an axial component.

4. The cleaning device of claim 1, wherein the concave second side of the disk member is designed such that a ratio between a maximum radial diameter of a concave shape of the concave second side and a maximum axial height of the concave shape of the concave second side is less than 30.

5. The cleaning device of claim 1, wherein the cleaning device comprises a plurality of nozzles arranged at regular intervals around the radial periphery of the disk member.

6. The cleaning device of claim 1, wherein the disk member is designed such that, during cleaning operation, less than 10% of the area of the concave second side is set at a minimum distance to the surface to be cleaned, wherein the minimum distance is no greater than a distance from a radial periphery of the disk member to the surface to be cleaned.

7. The cleaning device of claim 1, wherein the cleaning device further comprises a set of rollers arranged and configured for maintaining the disk member a minimum offset distance from the surface to be cleaned.

8. A cleaning system comprising:

a plurality of cleaning devices and a second stage pumping system, wherein an individual cleaning device comprises:

a disk member rotatable around a rotational axis (r), wherein the disk member comprises (i) a first side facing away from a surface to be cleaned during cleaning operation, (ii) a concave second side facing towards the surface to be cleaned during cleaning operation, (iii) a nozzle for discharging cleaning fluids under pressure against the surface, (iv) a nozzle conduit configured to establish fluid communication from a cleaning fluid source outside the individual cleaning device to the nozzle, and (v) a plurality of vanes protruding from the first side and into a suction cavity;

a disk housing covering the first side, wherein the disk housing is arranged and configured such that (i) a gap is formed between a radial periphery of the disk member and an inner wall of the disk housing and (ii) the suction cavity is provided between the inner wall and the first side;

a spindle rotatably coupled to the disk member;

a rotary motor providing rotational power to the spindle;

a discharge channel arranged in fluid communication with the suction cavity via at least one outflow opening in the disk housing, the at least one outflow opening being arranged at the radial periphery of the disk member to allow radial discharge of liquids from within the suction cavity; and wherein the disk member is configured such that, during cleaning operation, liquids flowing into the suction cavity from the concave second side during a cleaning operation are passing entirely through the gap, wherein, for the individual cleaning device, at least the disk member, the disk housing, the spindle, the rotary motor, the at least one outflow opening and the discharge channel constitute a first stage pumping system, wherein the second stage pumping system comprises (i) a motorized pump, (ii) a central liquid collector, and (iii) at least one second stage hose for each of the plurality of cleaning devices, wherein the at least one second stage hose for a respective cleaning device of the plurality of cleaning devices is arranged in fluid communication with the central liquid collector at a first end and with the discharge channel of the respective cleaning device at a second end, and wherein the second stage pumping system is configured to pump the liquids from the suction cavity of the first stage pumping system and to the central liquid collector.

9. The cleaning system of claim 8, wherein the cleaning system further comprises:

a central framework onto which the central liquid collector is connected; and a plurality of couplers connecting the plurality of cleaning devices to the central framework.

10. The cleaning system of claim 9, wherein the plurality of couplers is configured such that at least one cleaning device of the plurality of cleaning devices may pivot relative to the central framework when exposed to external pressure during cleaning operation.

11. The cleaning system of claim 8, wherein the cleaning system further comprises:

an external hose configured to guide liquids from the central liquid collector to an exterior location; and a check valve connected to the external hose, configured to control flow of liquids from the central liquid collector.

12. The cleaning system of claim 8, wherein the cleaning system further comprises:

a filter system comprising a first end in fluid communication with the central liquid collector, wherein the filter system is configured to filter particulates from the liquids pumped from the suction cavity.

13. An underwater vehicle comprising:

a cleaning system, wherein the cleaning system comprises a plurality of cleaning devices, and wherein an individual cleaning device comprises: (A) a disk member rotatable around a rotational axis (r), wherein the disk member comprises (i) a first side facing away from a surface to be cleaned during cleaning operation, (ii) a concave second side facing towards the surface to be cleaned during cleaning operation, (iii) a nozzle for discharging cleaning fluids under pressure against the surface, (iv) a nozzle conduit configured to establish fluid communication from a cleaning fluid source outside the individual cleaning device to the nozzle, and (v) a plurality of vanes protruding from the first side and into a suction cavity; (B) a disk housing covering the first side, wherein the disk housing is arranged and configured such that (i) a gap is formed between a radial periphery of the disk member and an inner wall of the disk housing and (ii) the suction cavity is provided between the inner wall and the first side; (C) a spindle rotatably coupled to the disk member; (D) a rotary motor providing rotational power to the spindle; and (E) a discharge channel arranged in fluid communication with the suction cavity via at least one outflow opening in the disk housing, the at least one outflow opening being arranged at the radial periphery of the disk member to allow radial discharge of liquids from within the suction cavity;

wherein the disk member is configured such that, during cleaning operation, liquids flowing into the suction cavity from the concave second side during a cleaning operation are passing entirely through the gap;

wherein, for the individual cleaning device, at least the disk member, the disk housing, the spindle, the rotary motor, the at least one outflow opening, and the discharge channel constitute a first stage pumping system, and wherein the cleaning system further comprises a second stage pumping system, wherein the second stage pumping system comprises (i) a motorized pump, (ii) a central liquid collector, and (iii) at least one second stage hose for each of the plurality of cleaning devices, wherein the at least one second stage hose for a respective cleaning device of the plurality of cleaning devices is arranged in fluid communication with the central liquid collector at a first end and with the discharge channel of the respective cleaning device at a second end, and wherein the second stage pumping system is configured to pump the liquids from the suction cavity of the first stage pumping system and to the central liquid collector; and wherein the underwater vehicle further comprises:

a set of front and rear vehicle rollers arranged and configured for rolling the underwater vehicle on the surface to be cleaned; and a plurality of thrusters arranged and configured to allow movements of the underwater vehicle in at least a direction perpendicular to the surface to be cleaned and a direction parallel to the surface to be cleaned.

14. The underwater vehicle of claim 13, wherein the underwater vehicle is a neutrally buoyant Remotely Operated Vehicle (ROV).

15. A method for cleaning a surface submerged in water by use of an underwater vehicle comprising a plurality of thrusters and a cleaning system, wherein the method comprises:

guiding the underwater vehicle by use of the plurality of thrusters until the cleaning system is set at a predetermined minimum offset distance from the surface to be cleaned, wherein the cleaning system comprises a plurality of cleaning devices, and wherein an individual cleaning device comprises: (A) a disk member rotatable around a rotational axis (r), wherein the disk member comprises (i) a first side facing away from the surface to be cleaned during cleaning operation, (ii) a concave second side facing towards the surface to be cleaned during cleaning operation, (iii) a nozzle for discharging cleaning fluids under pressure against the surface, (iv) a nozzle conduit configured to establish fluid communication from a cleaning fluid source outside the individual cleaning device to the nozzle, and (v) a plurality of vanes protruding from the first side and into a suction cavity; (B) a disk housing covering the first side, wherein the disk housing is arranged and configured such that (i) a gap is formed between a radial periphery of the disk member and an inner wall of the disk housing and (ii) the suction cavity is provided between the inner wall and the first side; (C) a spindle rotatably coupled to the disk member; (D) a rotary motor providing rotational power to the spindle; and (E) a discharge channel arranged in fluid communication with the suction cavity via at least one outflow opening in the disk housing, the at least one outflow opening being arranged at the radial periphery of the disk member to allow radial discharge of liquids from within the suction cavity;

wherein the disk member is configured such that, during cleaning operation, liquids flowing into the suction cavity from the concave second side during a cleaning operation are passing entirely through the gap;

wherein, for the individual cleaning device, at least the disk member, the disk housing, the spindle, the rotary motor, the at least one outflow opening, and the discharge channel constitute a first stage pumping system, and wherein the cleaning system further comprises a second stage pumping system, wherein the second stage pumping system comprises (i) a motorized pump, (ii) a central liquid collector, and (iii) at least one second stage hose for each of the plurality of cleaning devices, wherein the at least one second stage hose for a respective cleaning device of the plurality of cleaning devices is arranged in fluid communication with the central liquid collector at a first end and with the discharge channel of the respective cleaning device at a second end, and wherein the second stage pumping system is configured to pump the liquids from the suction cavity of the first stage pumping system and to the central liquid collector;

wherein the underwater vehicle further comprises a set of front and rear vehicle rollers arranged and configured for rolling the underwater vehicle on the surface to be cleaned;

wherein the plurality of thrusters of the underwater vehicle is arranged and configured to allow movements of the underwater vehicle in at least a direction perpendicular to the surface to be cleaned and a direction parallel to the surface to be cleaned; and wherein the method further comprises:

rotating the disk member by use of the rotary motor to a rotational velocity exceeding 350 rpm;

activating the motorized pump of the second stage pumping system; and guiding the underwater vehicle by use of the plurality of thrusters parallel to the surface to be cleaned.

* * * * *